(12) United States Patent
Lai et al.

(10) Patent No.: US 8,798,673 B2
(45) Date of Patent: Aug. 5, 2014

(54) COMMUNICATION METHOD OF MOBILE PHONE

(75) Inventors: Hou-Wen Lai, Shenzhen (CN); Wen-Hui Li, Shenzhen (CN)

(73) Assignees: Shenzhen Futaihong Precision Industry Co., Ltd., Shenzhen (CN); Chi Mei Communication Systems, Inc., New Taipei (TW)

(*) Notice: Subject to any disclaimer, the term of this patent is extended or adjusted under 35 U.S.C. 154(b) by 471 days.

(21) Appl. No.: 13/026,278

(22) Filed: Feb. 13, 2011

(65) Prior Publication Data

US 2012/0172029 A1 Jul. 5, 2012

(30) Foreign Application Priority Data

Dec. 31, 2010 (CN) .......................... 2010 1 0618210

(51) Int. Cl.
*H04W 88/06* (2009.01)
(52) U.S. Cl.
USPC .................. 455/552.1; 455/426.1; 455/435.2; 455/458; 455/435.3; 455/553.1; 370/338; 370/328
(58) Field of Classification Search
CPC .. H04W 88/06; H04W 48/18; H04W 36/0088

USPC ................ 455/458, 456.6, 422.1, 426.1, 453, 455/552.1, 435.2, 435.3; 370/328, 338, 370/229, 230, 335, 311
See application file for complete search history.

(56) References Cited

U.S. PATENT DOCUMENTS

| | | | |
|---|---|---|---|
| 2001/0015963 A1* | 8/2001 | Tuomainen et al. | 370/311 |
| 2009/0154385 A1* | 6/2009 | Makhija et al. | 370/311 |
| 2011/0124352 A1* | 5/2011 | Reinhold et al. | 455/458 |
| 2012/0027003 A1* | 2/2012 | Chin et al. | 370/342 |

\* cited by examiner

*Primary Examiner* — Patrick Edouard
*Assistant Examiner* — Fred Casca
(74) *Attorney, Agent, or Firm* — Novak Druce Connolly Bove + Quigg LLP

(57) ABSTRACT

A communication method is used for a mobile phone. The mobile phone is capable of receiving a first subscriber identity module (SIM) card and a second SIM card. The mobile phone acquires a first paging reception time of the first SIM card and a second paging reception time of the second SIM card, and further calculates a minimum time gap between the first paging reception time and the second paging reception time. If the minimum time gap is less than a threshold time gap, the mobile phone modulates the first paging reception time and the second paging reception time, such that the minimum time gap is not less than the threshold time gap.

9 Claims, 4 Drawing Sheets

COMMUNICATION METHOD OF MOBILE PHONE

BACKGROUND

1. Technical Field

The present disclosure relates to a communication method of a mobile phone.

2. Description of Related Art

A dual subscriber identity module (SIM) mobile phone can receive two SIM cards. The dual SIM mobile phone often provides a "Dual SIM Dual Standby" function in which two active SIM cards can be accessed simultaneously, using only one transceiver of the dual SIM mobile phone. When the two SIM cards are registered in a mobile telecommunication network, a base station will periodically page the two SIM cards by transmitting a paging channel (PCH) message. However, either one of the two SIM cards may miss the PCH message due to paging reception conflict between the two SIM cards.

DETAILED DESCRIPTION

In general, the word "module" as used herein, refers to logic embodied in hardware or firmware, or to a collection of software instructions, written in a programming language, such as, for example, Java, C, or Assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as software and/or a hardware unit and may be stored in any type of computer-readable medium or other computer storage device.

Figure 1:
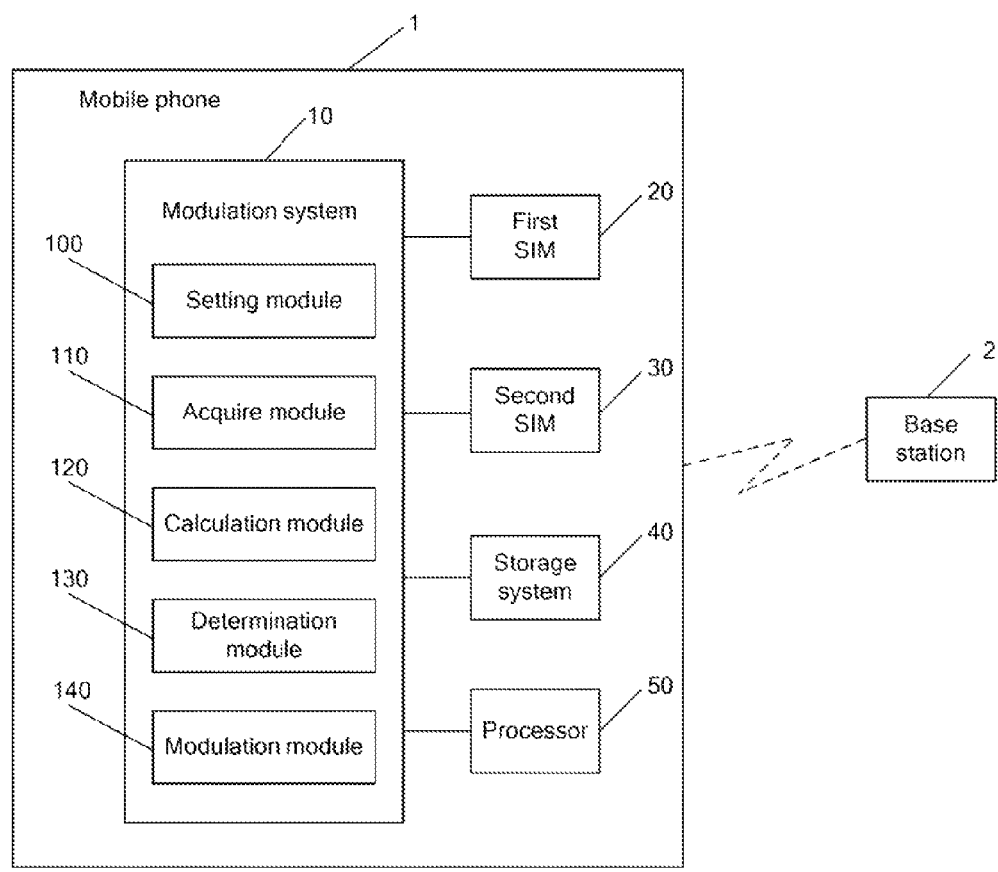
FIG. 1 is a block diagram of a mobile phone including a modulation system, a storage system, and a processor.

FIG. 1 is a block diagram of a mobile phone 1 including a modulation system 10, a storage system 40, and a processor 50. The mobile phone 1 is capable of receiving a first subscriber identity module (SIM) card 20 and a second SIM card 30, and communicates with a base station 2 of a mobile telecommunication network. The modulation system 10 includes a setting module 100, an acquire module 110, a calculation module 120, a determination module 130, and a modulation module 140. The modules 100-140 may comprise computerized code in the form of one or more programs that are stored in the storage system 40. The computerized code includes instructions that are executed by the processor 50 to provide functions for the modules 100-140.

The base station 2 periodically pages the first SIM card 20 and the second SIM card 30 by transmitting a paging channel (PCH) message when the first SIM card 20 and the second SIM card 30 are registered in the mobile telecommunication network. Each time that the first SIM card 20 periodically receives the PCH message is defined as a first paging reception time. Each time that the second SIM card 30 periodically receives the PCH message is defined as a second paging reception time. In a time division multiple access (TDMA) system, a timeslot shall have a duration of 577 µs. Eight timeslots shall form a TDMA frame (approximately 4.62 ms in duration). In the embodiment, the base station 2 may transmit the PCH message to the first SIM card 20 per fifty TDMA frames, and transmit the PCH message to the second SIM card 30 per sixty TDMA frames. A time gap between the first paging reception time and the second paging reception time which has minimum numeric, is defined as a minimum time gap.

The first SIM card 20 and the second SIM card 30 receive the PCH message by turns. After either one of the first SIM card 20 or the second SIM card 30 receives the PCH message, the processor 50 cannot promptly instruct the other one to receive the PCH message if the minimum time gap is less than a threshold time gap. The threshold time gap relates to performance of the processor 50 and can be measured. In the embodiment, the threshold time gap can be 50 ms. The setting module 100 sets the threshold time gap as a comparison basis after the threshold time gap is measured. The acquire module 110 acquires the first paging reception time and the second paging reception time. The calculation module 120 calculates the minimum time gap between the first paging reception time and the second paging reception time. The determination module 130 determines whether the minimum time gap is less than the threshold time gap. The modulation module 140 modulates the first paging reception time and the second paging reception time, such that the minimum time gap is not less than the threshold time gap when the minimum time gap is less than the threshold time gap. In the embodiment, the modulation module 140 decreases paging reception frequencies of the first SIM card 20 and the second SIM card 30 to increase the minimum time gap.

Figure 2:
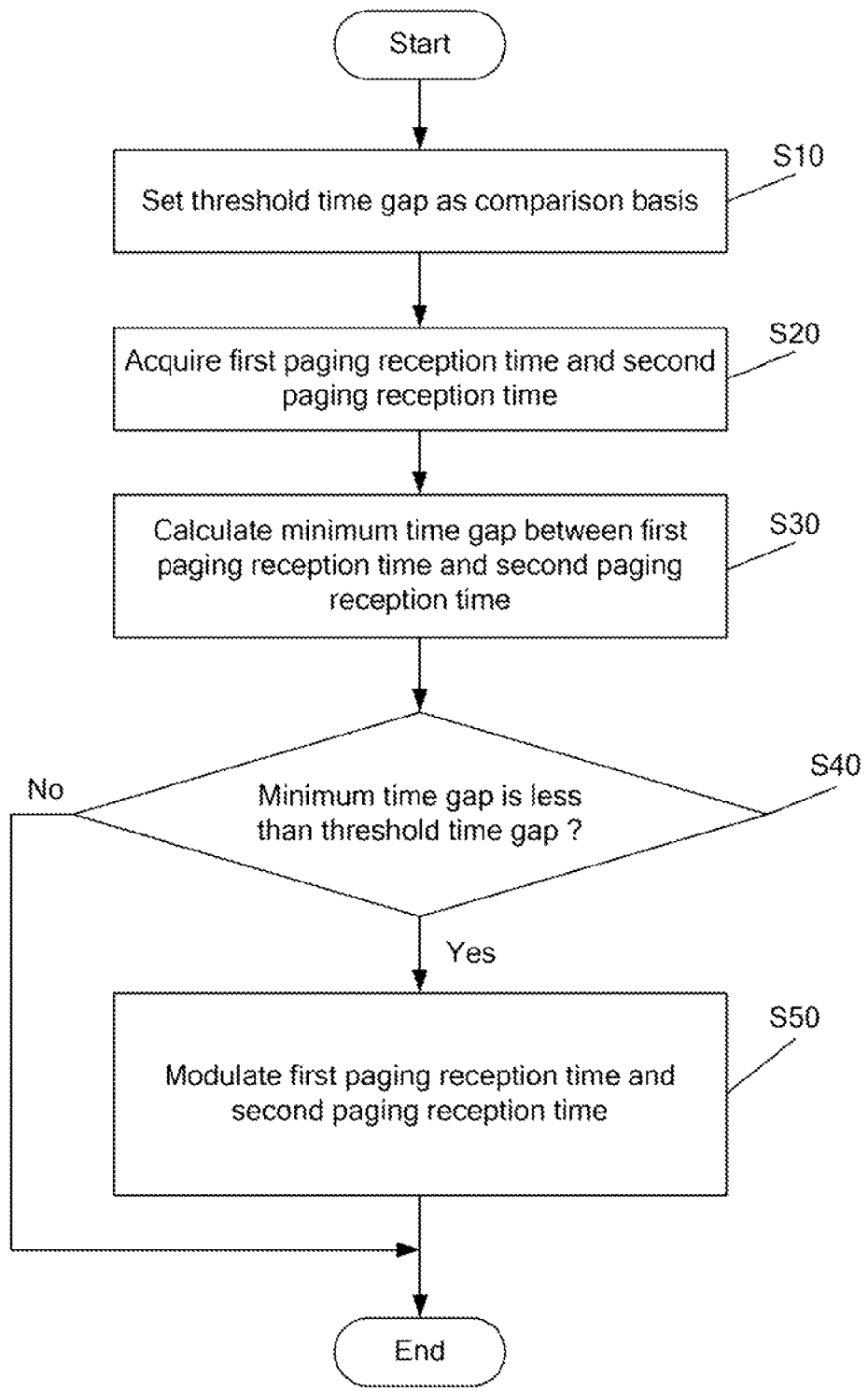
FIG. 2 is a flowchart illustrating one embodiment of a communication method of a mobile phone.

FIG. 2 is a flowchart illustrating one embodiment of a communication method of the mobile phone 1. Depending on the embodiment, additional blocks may be added, others removed, and the ordering of the blocks may be changed.

In block S10, the setting module 100 sets the threshold time gap as the comparison basis.

In block S20, the acquire module 110 acquires the first paging reception time and the second paging reception time.

In block S30, the calculation module 120 calculates the minimum time gap between the first paging reception time and the second paging reception time.

In block S40, the determination module 130 determines whether the minimum time gap is less than the threshold time gap. If the minimum time gap is not less than the threshold time gap, the process is complete.

If the minimum time gap is less than the threshold time gap, in block S50, the modulation module 140 modulates the first paging reception time and the second paging reception time, such that the minimum time gap is not less than the threshold time gap.

Figure 3:
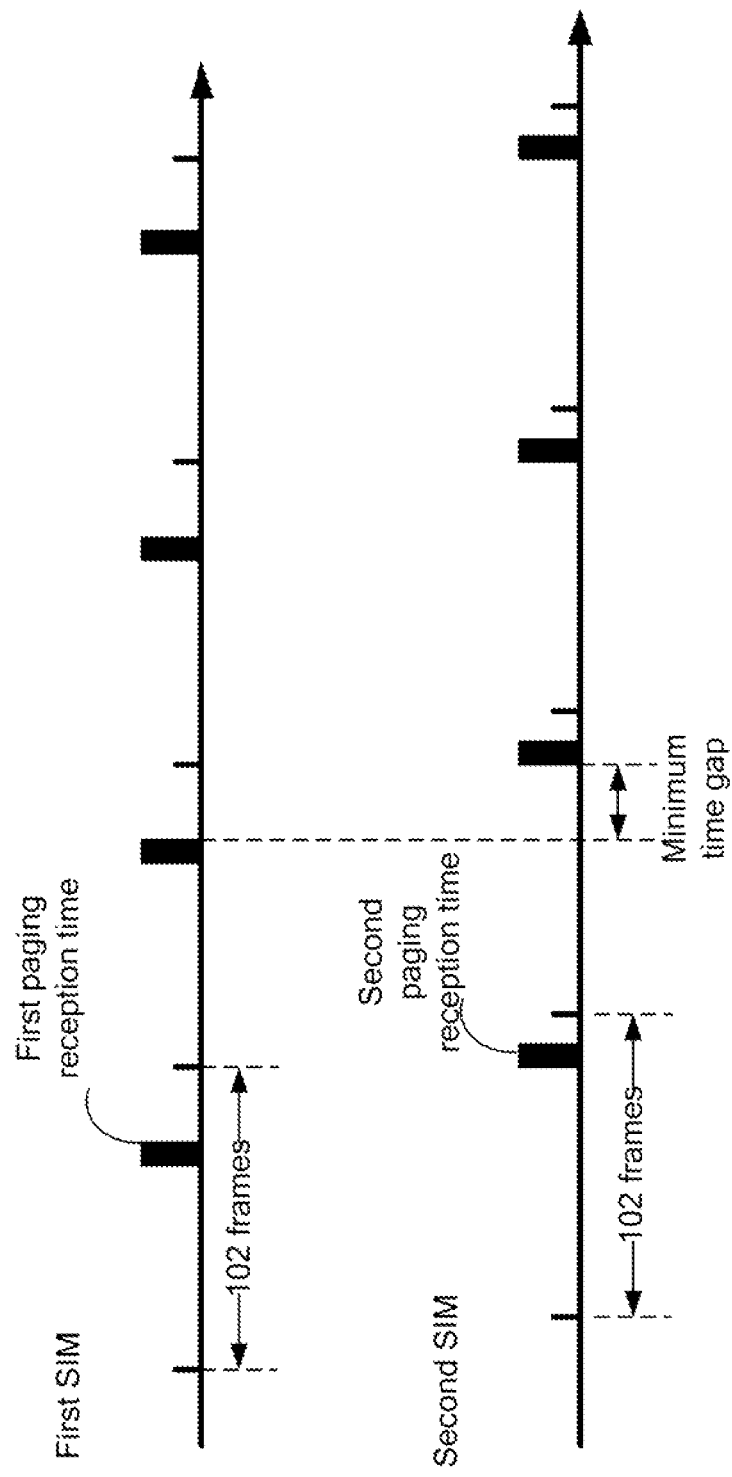
FIG. 3 is a paging reception cycle diagram before modulating a minimum time gap.

FIG. 3 is a paging reception cycle diagram before modulating the minimum time gap. The paging reception frequencies of the first SIM card 20 and the second SIM card 30 are individually four times in duration. Paging reception cycles of the first SIM card 20 and the second SIM card 30 are individually 102 TDMA frames.

Figure 4:
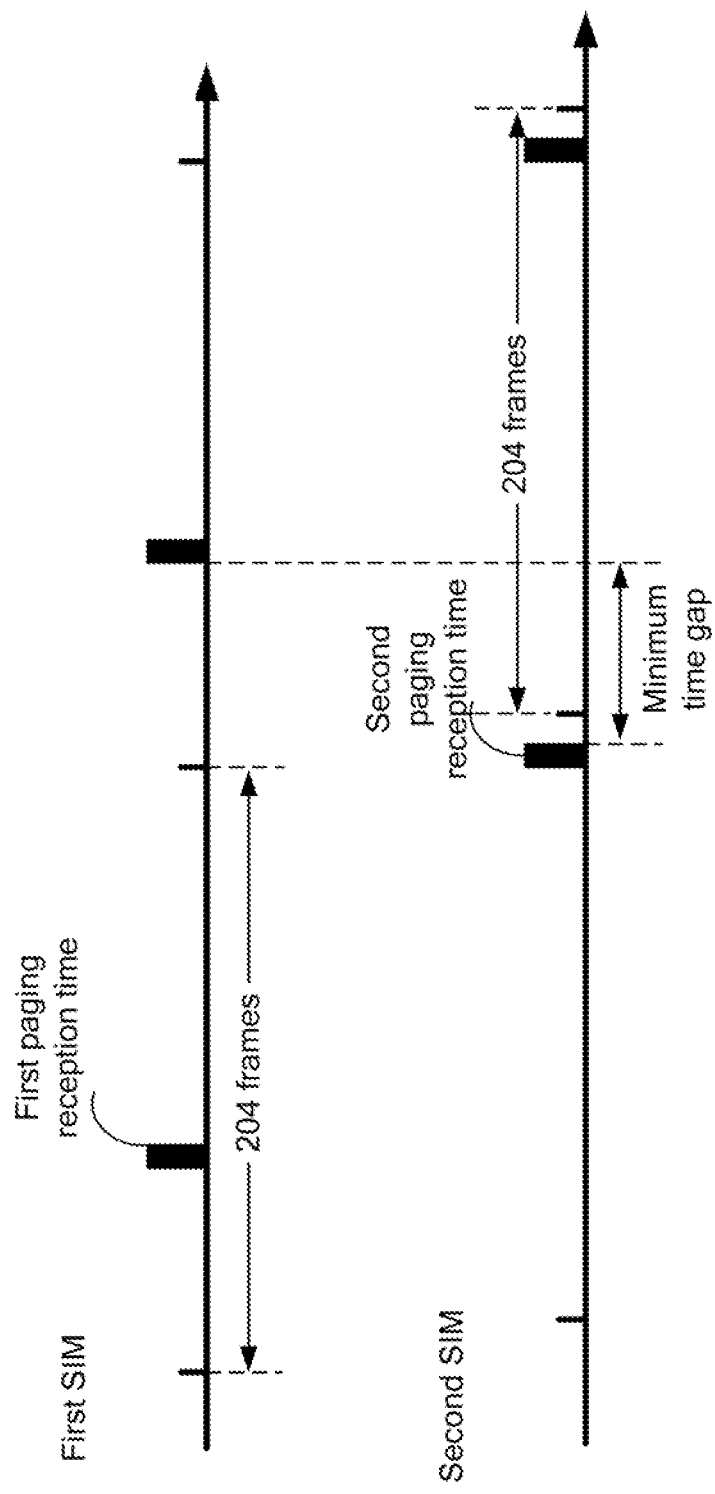
FIG. 4 is a paging reception cycle diagram after modulating a minimum time gap.

FIG. 4 is a paging reception cycle diagram after modulating a minimum time gap. The paging reception frequencies of the first SIM card 20 and the second SIM card 30 are individually decreased to two times in duration. The paging reception cycles of the first SIM card 20 and the second SIM card 30 are individually 204 TDMA frames. The minimum time gap shown in FIG. 4 is larger than the same shown in FIG. 3.

The present disclosure provides a communication method of a dual SIM mobile phone. The paging reception conflict between the dual SIM cards can be avoided.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented communication method of a mobile phone, the mobile phone capable of receiving a first subscriber identity module (SIM) card and a second SIM card, the method comprising:
   acquiring a first paging reception time of the first SIM card and a second paging reception time of the second SIM card;
   calculating a minimum time gap between the first paging reception time and the second paging reception time,
   the first paging reception time being each time that the first SIM card periodically receives a paging channel (PCH) message transmitted from a base station of a mobile telecommunication network;
   setting a threshold time gap as a comparison basis;
   determining whether the minimum time gap is less than the threshold time gap; and
   increasing the minimum time gap by modulating the first paging reception time and the second paging reception time until the minimum time gap is not less than the threshold time gap.

2. The method of claim 1, wherein the second paging reception time is each time that the second SIM card periodically receives the PCH message transmitted from the base station of the mobile telecommunication network.

3. The method of claim 1, wherein the step of modulating further comprises:
   decreasing paging reception frequencies of the first SIM card and the second SIM card.

4. A mobile phone capable of receiving a first subscriber identity module (SIM) card and a second SIM card, comprising:
   a storage device;
   at least one processor;
   a display;
   one or more programs stored in the storage device and being executable by the at least one processor, causes the processor to:
      acquire a first paging reception time of the first SIM card and a second paging reception time of the second SIM card;
      calculate a minimum time gap between the first paging reception time and the second paging reception time,
      the first paging reception time being each time that the first SIM card periodically receives a paging channel (PCH) message transmitted from a base station of a mobile telecommunication network;
      set a threshold time gap as a comparison basis;
      determine whether the minimum time gap is less than the threshold time gap; and
      increase the minimum time gap by modulating the first paging reception time and the second paging reception time until the minimum time gap is not less than the threshold time gap.

5. The mobile phone of claim 4, wherein the second paging reception time is each time that the second SIM card periodically receives the PCH message transmitted from the base station of the mobile telecommunication network.

6. The mobile phone of claim 4, wherein the processor further decreases paging reception frequencies of the first SIM card and the second SIM card.

7. A non-transitory storage medium having stored thereon instructions that, when executed by a processor, causing the processor to perform a communication method of a mobile phone, the mobile phone capable of receiving a first subscriber identity module (SIM) card and a second SIM card, wherein the method comprises:
   acquire a first paging reception time of the first SIM card and a second paging reception time of the second SIM card;
   calculate a minimum time gap between the first paging reception time and the second paging reception time,
   the first paging reception time being each time that the first SIM card periodically receives a paging channel (PCH) message transmitted from a base station of a mobile telecommunication network;
   set a threshold time gap as a comparison basis;
   determine whether the minimum time gap is less than the threshold time gap; and
   increase the minimum time gap by modulating the first paging reception time and the second paging reception time until the minimum time gap is not less than the threshold time gap.

8. The non-transitory storage medium of claim 7, wherein the second paging reception time is each time that the second SIM card periodically receives the PCH message transmitted from the base station of the mobile telecommunication network.

9. The non-transitory storage medium of claim 7, wherein the method further comprises:
   decrease paging reception frequencies of the first SIM card and the second SIM card.

* * * * *